United States Patent
Bergen et al.

(10) Patent No.: US 8,616,812 B2
(45) Date of Patent: Dec. 31, 2013

(54) HEADER TRAILER

(76) Inventors: Allan Bergen, Drake (CA); Edward Bergen, Drake (CA)

(*) Notice: Subject to any disclaimer, the term of this patent is extended or adjusted under 35 U.S.C. 154(b) by 291 days.

(21) Appl. No.: 12/779,551

(22) Filed: May 13, 2010

(65) Prior Publication Data

US 2011/0176882 A1 Jul. 21, 2011

(30) Foreign Application Priority Data

Jan. 21, 2010 (CA) .................................. 2690693

(51) Int. Cl.
*B60P 7/08* (2006.01)

(52) U.S. Cl.
USPC .................................. 410/44; 410/2; 280/789

(58) Field of Classification Search
USPC .......... 410/2, 44, 77, 80, 156; 56/228, 473.5; 280/781, 405.1, 789, 656, 35; 248/670
See application file for complete search history.

(56) References Cited

U.S. PATENT DOCUMENTS

| | | | |
|---|---|---|---|
| 5,040,825 A | 8/1991 | Kuhns | |
| 5,333,904 A | 8/1994 | Kuhns | |
| 5,529,447 A * | 6/1996 | Bruns et al. | 410/2 |
| 5,785,472 A | 7/1998 | Smith et al. | |
| 6,047,989 A | 4/2000 | Wood | |
| 6,428,047 B1 | 8/2002 | Kaderabek | |

* cited by examiner

*Primary Examiner* — Stephen Gordon
(74) *Attorney, Agent, or Firm* — Trego, Hines & Ladenheim, PLLC

(57) ABSTRACT

A trailer apparatus for transporting a harvest header has a main beam on wheels. A bed assembly is pivotally attached to the main beam above the main beam such that when one side of the bed assembly moves up, an opposite side moves down. The bed assembly is supported at a desired tilt angle by adjustable tilt. The bed assembly includes a movable side extension along one side that is movable through a range from an extended position to a retracted position and can be releasably locked in the range. The tilt angle can be adjusted independently of the position of the side extension. A middle portion of the main beam and bed assembly can be laterally offset to form a recess to accommodate lift arms of a self propelled swather when the swather header is loaded on the bed assembly.

7 Claims, 9 Drawing Sheets

HEADER TRAILER

BACKGROUND

This invention is in the field of trailers and in particular trailers for transporting agricultural harvesting headers.

Agricultural harvest headers are used at the front end of various kinds of harvesters, such as combines and swathers, for cutting crops for harvest. These headers typically include a knife assembly to cut the crop, a bed to receive the cut material, and a reel to force the standing crop plants into the knife and then onto the bed. As with virtually all agricultural equipment, harvesters have become larger and the headers that feed the harvesters have become wider. Driving a harvester with the header attached anything but a very short distance on a road is therefore not feasible, as the headers block the road completely.

Other very wide agricultural equipment is designed to fold to a much narrower width for transport, however harvest headers are quite complex with many moving parts and so designing them to fold is problematic. It is therefore known to place the header on a trailer, detached from the harvester, and carried lengthwise down the road.

To detach the header from a typical harvester, the harvester moves toward the trailer bed with the header raised and maneuvers the header into position over the trailer bed and then lowers the header onto the bed. Various latches, drives, hose connections, electrical wiring connections, and the like must be disconnected in a typical modern harvester in order to detach the header, and once disconnected the harvester is moved away and the header resting on the trailer bed is secured to the trailer bed.

A problem arises with some types of harvest implements, notably self-propelled swathers, because lift arms extend forward under the header to support the header. These lift arms contact the various parts of the trailer bed when the swather moves the header over the trailer bed to drop the header, making it awkward and difficult to place the swather header onto the bed.

Since harvest headers are of various types, and also vary in their structure depending on the manufacturer it is desirable to provide some adjustability so that the trailer can be adapted to carry a variety of headers. U.S. Pat. Nos. 5,040,825 and 5,333,904 to Kuhns disclose a combine header trailer that includes a variety of adjustable support brackets to support the header on the trailer. U.S. Pat. No. 6,047,989 to Wood discloses a header trailer that is adjustable for carrying different types of grain headers. U.S. Pat. No. 5,785,472 to Smith shows a header wagon with adjustments allowing same to carry different equipment, such as a corn header and a grain header.

U.S. Pat. No. 6,428,047 to Kaderabek discloses combine header transport that rotates the header to a generally vertical orientation to reduce the travel width of the header on the trailer.

SUMMARY OF THE INVENTION

It is an object of the present invention to provide a harvest header trailer apparatus that overcomes problems in the prior art.

In a first embodiment the present invention provides a trailer apparatus for transporting a harvest header. The apparatus comprises an elongated main frame member supported on wheels for movement in an operating travel direction, the wheels oriented such that a longitudinal axis of the main frame member is substantially aligned with the operating travel direction. An open bed assembly extends along a length of the main frame member, and the bed assembly is pivotally attached at a middle portion thereof to the main frame member about a bed pivot axis extending substantially in alignment with the operating travel direction above the main frame member, such that the bed assembly extends laterally out from each side of the main frame member, and such that when a first side of the bed assembly on a first side of the main frame member moves up, an opposite second side of the bed assembly on an opposite second side of the main frame member moves down. The bed assembly is supported by tilt braces extending from the main frame member to the bed assembly, and wherein the tilt braces are adjustable such that the bed assembly can be oriented at, and releasably locked at, a desired tilt angle with respect to the main frame member. The bed assembly includes a movable side extension along an extendable side of the bed assembly, with a raised support beam extending along an outer edge of the side extension. The side extension is movable through a range from an extended position, where the support beam is located a maximum distance from the main frame member, to a retracted position, where the support beam is located a minimum distance from the main frame member, and the side extension can be releasably locked at a plurality of positions in the range. The tilt angle can be adjusted independently of the position of the side extension.

In a second embodiment the present invention provides a trailer apparatus for transporting a harvest header. The apparatus comprises a main beam supported on wheels for movement in an operating travel direction, the wheels oriented such that a longitudinal axis of the main beam is substantially aligned with the operating travel direction. An open bed assembly extends along a length of the main beam, the bed assembly comprising a plurality of cross beams spaced at intervals along the length of the main beam, each cross beam pivotally attached at a middle portion thereof to the main beam about a bed pivot axis, such that when a first side of the bed assembly on a first side of the main beam moves up, an opposite second side of the bed assembly on an opposite second side of the main beam moves down. Right and left side beams are attached to corresponding right and left ends of the cross beams. The bed assembly is supported by tilt braces extending from the main beam to one of the right and left side beams, and the tilt braces are adjustable such that the bed assembly can be oriented at, and releasably locked at, a desired tilt angle with respect to the main beam. The bed assembly includes a movable side extension along an extendable side of the bed assembly, with a raised support beam extending along an outer edge of the side extension. The side extension is movably attached to first end portions of the cross beams such that the side extension is movable through a range from an extended position, where the support beam is located a maximum distance from the main beam, to a retracted position, where the support beam is located a minimum distance from the main beam, and the side extension can be releasably locked at a plurality of positions in the range. The tilt angle can be adjusted independently of the position of the side extension.

In a third embodiment the present invention provides a trailer apparatus for transporting a harvest header. The apparatus comprises an elongated header bed configured to support a harvest header and supported on wheels for movement in an operating travel direction. The header bed defines a recess on a recessed side thereof configured such that lift arms of a self propelled swather can enter the recess when a header of the swather is being loaded on the header bed.

The trailer apparatus of the present invention provides independent extension of the width of the bed assembly, and tilting angle of the bed assembly. Tilting the bed assembly by raising one side thereof causes the opposite side to move down, reducing the distance of the one side from the ground, and facilitating loading and unloading of headers from the bed assembly. Offsetting the header bed to form a recess facilitates loading and unloading of headers of self propelled swathers.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
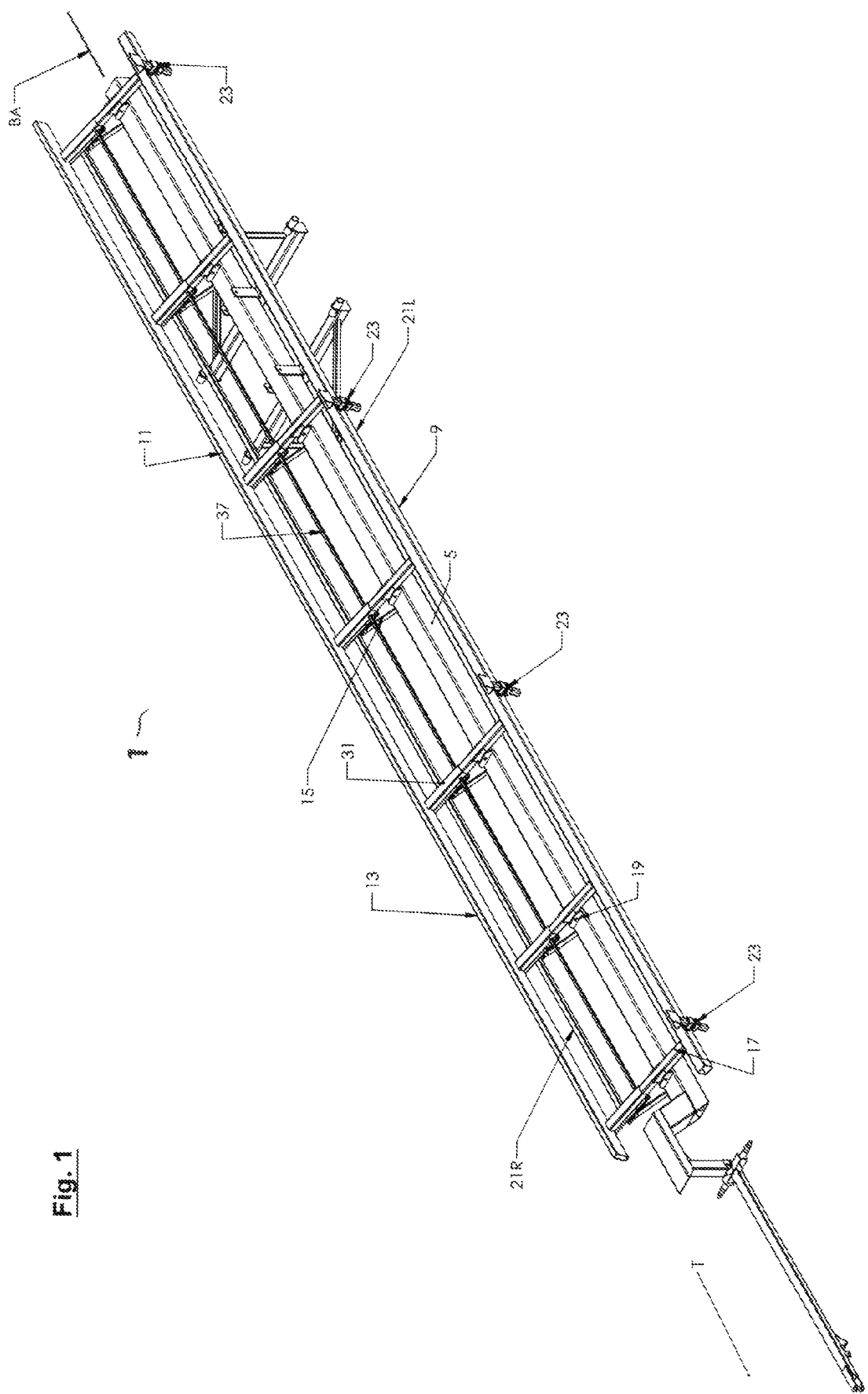
FIG. 1 is a perspective view of an embodiment of a trailer apparatus of the present invention, with wheels removed.

FIGS. 1-4 illustrate an embodiment of a trailer apparatus 1 of the present invention for transporting a harvest header 3. The apparatus 1 comprises an elongated main frame member, provided in the illustrated apparatus 1 by a main beam 5, supported on wheels 7 for movement in an operating travel direction T. The wheels 7 are oriented such that a longitudinal axis LA of the main beam 5 is substantially aligned with the operating travel direction T.

Rear wheels 7R are mounted on rear axles 8 attached under a rear portion of the main 5, and castering front wheels 7F pivot about the vertical caster axis CA and support the front end of the main beam 5.

An open bed assembly 9 extends along a length of the main beam 5. The bed assembly 9 is described as open because it comprises various members described below and open space between the members. Since the apparatus is designed to carry harvest headers the open design provides strength and support for the headers where it is needed, and only as many members as is required to thereby minimize weight and cost while providing the necessary structure.

The bed assembly 9 is pivotally attached at a middle portion thereof to the main beam 5 about a bed pivot axis BA extending substantially in alignment with the operating travel direction T above the main beam 5. The bed assembly 9 thus extends laterally out from each side of the main 5, and when one side of the bed assembly 9 on a one side of the main beam 5 moves up, the opposite side of the bed assembly 9 on the opposite second side of the main frame beam moves down.

Figure 4:
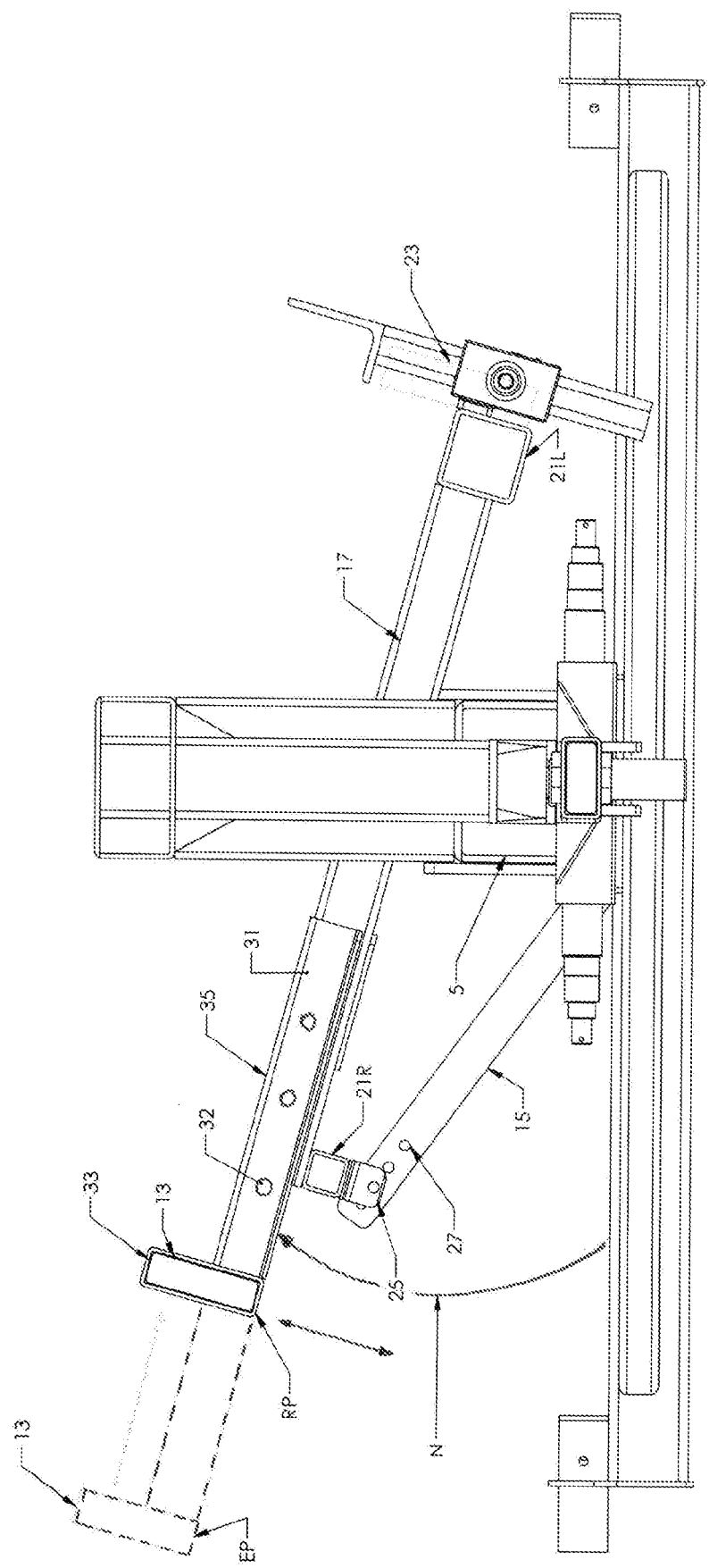
FIG. 4 is a front view of the embodiment of FIG. 1 with wheels removed.

The bed assembly 9 includes a movable side extension 11 along an extendable side of the bed assembly 9, with a raised support beam 13 extending along an outer edge of the side extension 11. The side extension 11 is movable, as seen in FIG. 4, through a range from an extended position EP, where the support beam 13 is located a maximum distance from the main beam 5, to the retracted position RP where the support beam 13 is located a minimum distance from the main beam 5. The side extension 11 can be releasably locked at a plurality of positions in the range.

The bed assembly 9 is supported by tilt braces 15 extending from the main beam 5 to the bed assembly 9, and the tilt braces 15 are adjustable such that the bed assembly 9 can be oriented at, and releasably locked at, a desired tilt angle N with respect to the main beam 5. The tilt angle N can be adjusted independently of the position of the side extension 11 in its range, thus allowing maximum adjustability to accommodate a variety of header types and sizes.

Right and left rear wheels 7R on the rear axles 8 are located outside right and left side edges of the bed assembly 9, such that pivotal movement about the bed pivot axis BA, and movement of the side extension 11 through its range is not affected by the wheels 7R.

The illustrated open bed assembly 9 comprises a plurality of cross beams 17 spaced at intervals along a length of the main beam 5. Each cross beam 17 is pivotally attached at a middle portion thereof to the main beam 5 by a pivot assembly 19 comprising a pin through a bed pivot bracket that is welded to the top of the main beam 5. The pins of each pivot assembly 19 are aligned along and form the bed pivot axis BA.

The illustrated apparatus 1 shows the side extension 11 on the right side of the apparatus 1, as will typically be the case, however it is contemplated that the side extension could also be on the left side of the apparatus 1. Right and left side beams 21R, 21L are attached to corresponding right and left ends of the cross beams 17. The right side beam 21R is attached under the right end portions of the cross beams 17, and the left side beam 21L is attached along left ends of the cross beams 17 on the fixed side of the bed assembly 9 opposite the side extension 11. Stop members 23 are attached to the left side beam and extend upward above top edges of the cross beams 17.

The tilt braces 15 extend between main beam 5 and the right side beam 21R which has brackets 25 extending down from a bottom side thereof. The tilt braces 15 are adjustably engaged in the brackets 25 by placing a pin through one of the holes 27 in the tilt brace 15.

The side extension 11 comprises a plurality of extension members 31. Each extension member 31 is movable along, and releasably lockable with respect to, a corresponding right end portion of one of the cross beams 17. The support beam 13 is attached to outer ends of the extension members 31 such that a top surface 33 of the support beam 13 is above a top surface 35 of the extension members 31, and provides a support along the length of the bed assembly 9 on which the front end of the header 3 can rest. The continuous support is beneficial particularly in supporting flexing headers where the front part of the header is movable up and down.

The extension members 31 are telescopically connected to the right end portions of the cross beams 17 such that same can slide in and out as shown in FIG. 4. The extension members can be locked to the cross beams 17 at the desired location by a pin through holes 32, or by a clamp or other known means. The extension members 31 are connected together by the support beam 13 attached to the outer end of each extension member, and also by extension bracing members 37 that extend between rear portions of adjacent extension members 31. Thus all these parts are connected to form the side extension 11 that moves in and out, sliding on the cross beams 17. Typically a header 3 will be placed on the bed assembly 9 with the front knife end 41 beyond the support beam 13, as schematically shown at 41A in FIG. 2, and the rear end 43 resting on the cross beams 17 and/or left side beam 21L, beside the stop members 23 as schematically shown at 43A in FIG. 2. The stop members 23 serve to keep the header 3 from sliding down the inclined bed assembly 9 and off the apparatus 1.

Figure 2:
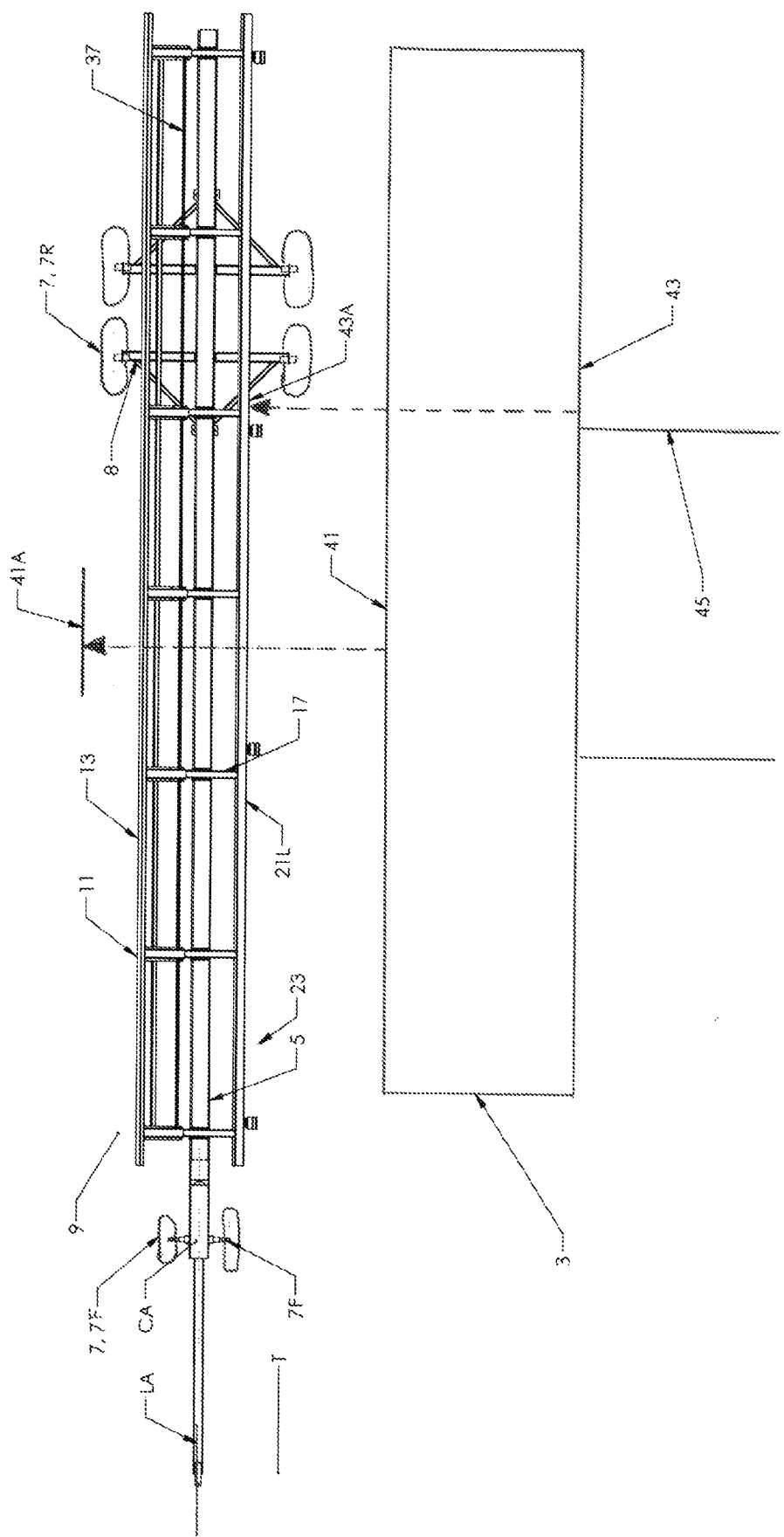
FIG. 2 is a top view of the embodiment of FIG. 1 with wheels attached, and shows a header attached to the feeder house of a combine harvester adjacent to the trailer apparatus.
Figure 3:
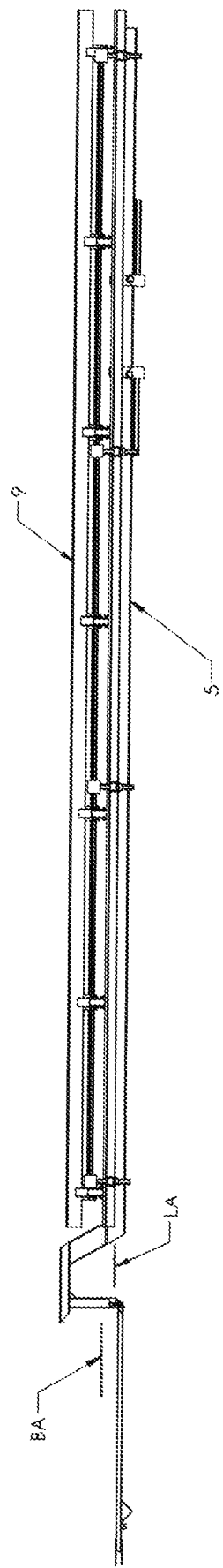
FIG. 3 is a side view of the embodiment of FIG. 1 with wheels removed.

The bed assembly 9 can be tilted up and down to vary the tilt angle N, and to facilitate connecting and disconnecting headers 3 from the harvesters to which they are attached. For example FIG. 2 shows the header 3 attached to the feeder house of a combine harvester, and approaching the fixed side of the bed assembly 9 of the illustrated trailer apparatus 1. In a typical combine, the header 3 is attached to the feeder house 45 and the feeder house is moved up and down by hydraulic cylinders. Thus the header 3 can be moved to a position above the bed assembly 9, and then lowered to rest on the bed assembly 9 with the front end thereof at 41A and the rear end thereof at 43A, and at a tilt angle. The feeder house 45 must then be disconnected. Similarly when removing the header from the bed assembly 9, the feeder house 45 must be moved into position to reconnect the header 3.

Figure 5:
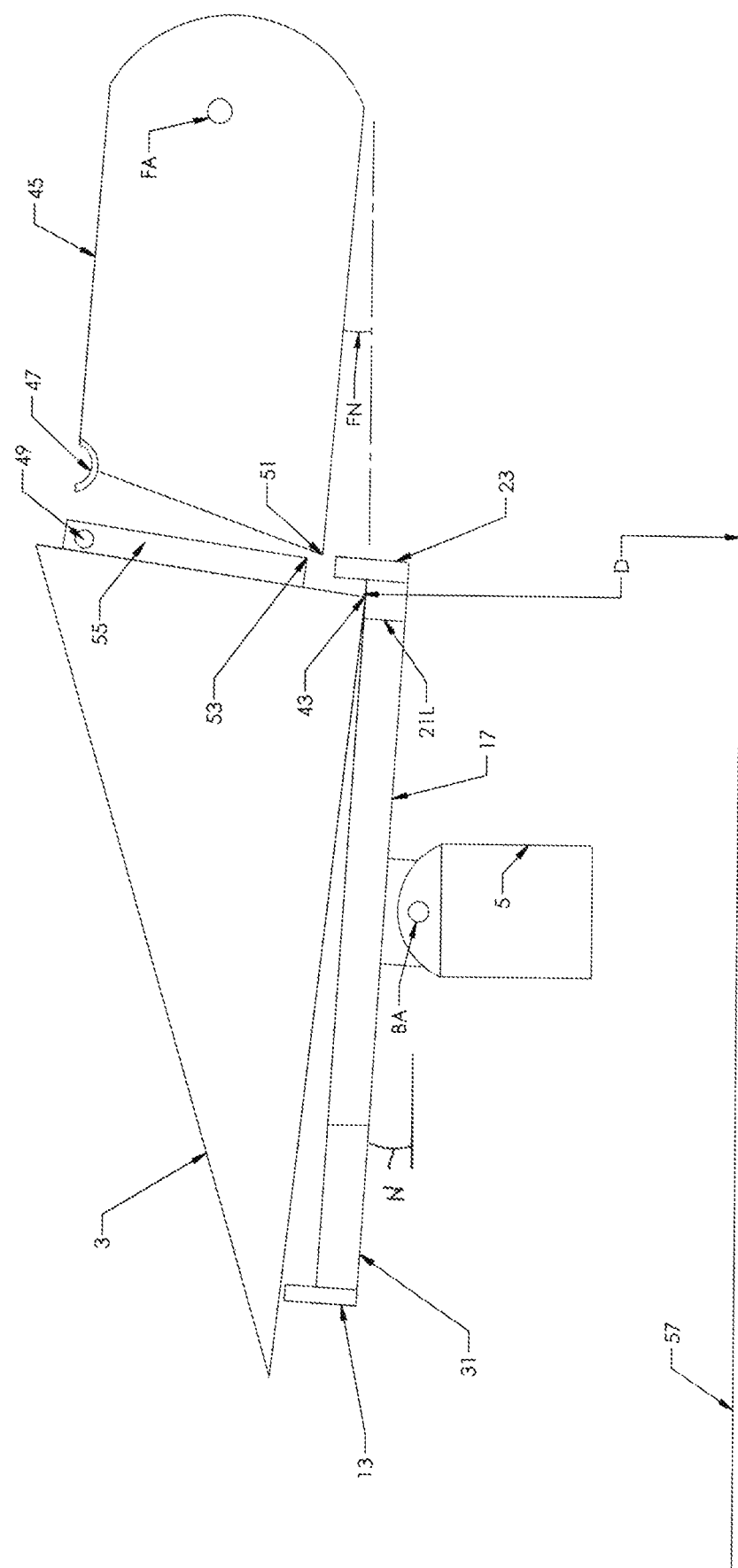
FIG. 5 is a schematic side view showing a header resting on the bed assembly of the embodiment of FIG. 1, with the bed assembly at a low tilt angle, and a header attached to the feeder house of a combine harvester adjacent to the header.
Figure 6:
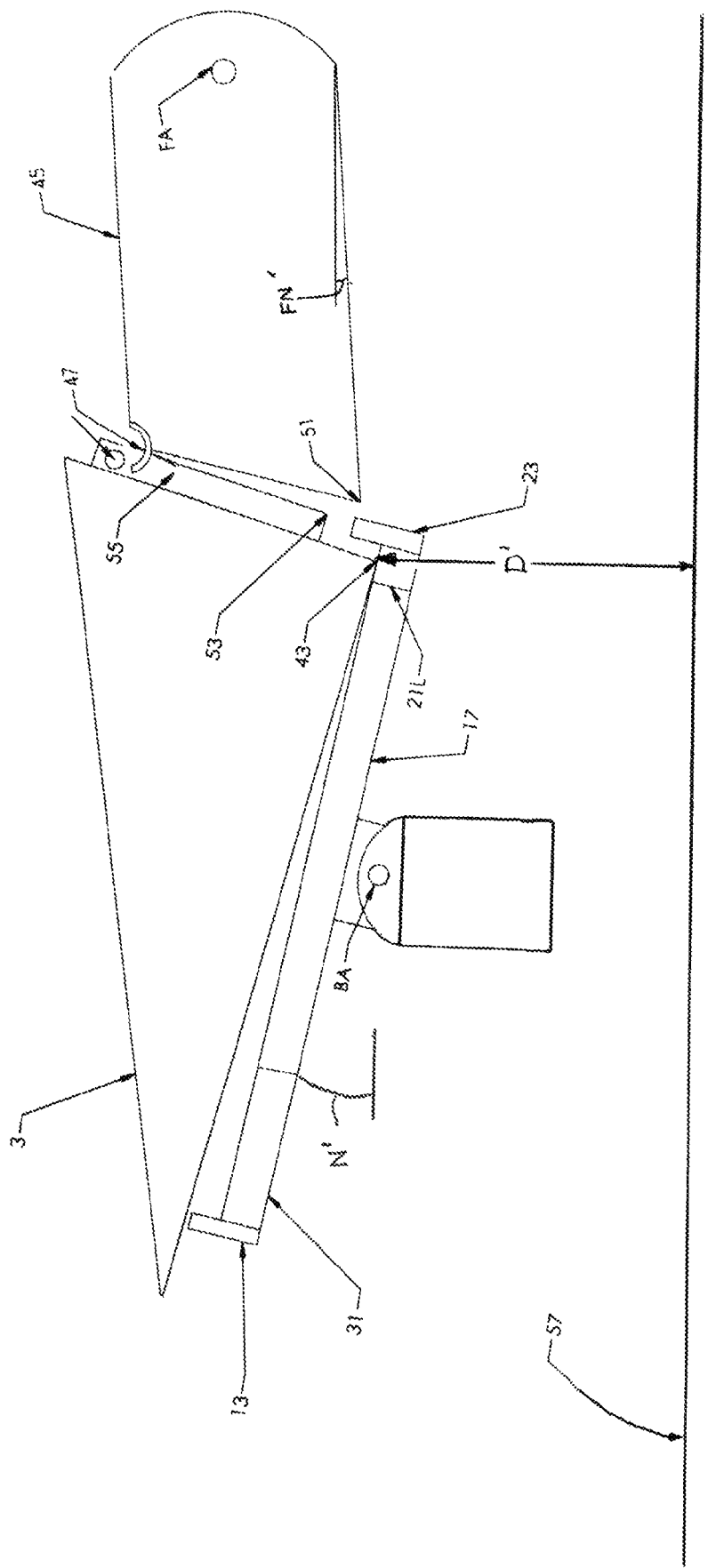
FIG. 6 is a schematic side view showing a header resting on the bed assembly of the embodiment of FIG. 1, with the bed assembly at a high tilt angle, and a header attached to the feeder house of a combine harvester adjacent to the header.

FIGS. 5 and 6 schematically illustrate the reconnection of a common type of header 3 to the feeder house 45 of a combine harvester in order to remove same from the trailer apparatus. The feeder house 45 is pivotally attached to the combine harvester (not further illustrated) about a feeder pivot axis FA, and is pivoted up and down by hydraulic cylinders (not shown) When in a field working position the feeder house 45 will be lowered and inclined generally downward to bring the header close to the ground to cut the crop. When approaching the trailer to place the header on the bed assembly 9, or to remove same, the header must be raised and the feeder house will then be oriented more in an upward orientation as shown in FIGS. 5 and 6.

A common mechanism used to attach the header 3 comprises a hook 47 and a pin 49. The hook 47 my be provided by a ledge across the top front of the feeder house that engages a plate extending from the header that provides the pin 49, but the concept is substantially as illustrated. FIG. 5 shows the header 3 resting on the bed assembly 9 with support beam 13, left side beam 21L, extension member 31, cross beam 17, and stop members 23. The bed assembly 9 is oriented at a low tilt angle N about the bed pivot axis BA above the main beam 5. The feeder house 45 is shown adjacent to the header 3 and it can be seen that the hook 47 cannot move under the pin 49 because the bottom edge 51 of the feeder house 45 contacts the bottom 53 of the header attachment bracket 55, and the feeder house 45 cannot move any farther forward, and reconnection of the header 3 to the feeder house 45 is not possible.

FIG. 6 in contrast shows the header 3 resting on the bed assembly 9 oriented at a higher tilt angle N', such that the header 3 is tipped up at the front and down at the back compared to the orientation shown in FIG. 5. The feeder house 45 is shown adjacent to the header 3 and it can be seen that the hook 47 can now move under the pin 49 because the bottom edge 51 of the feeder house 45 does not contact the bottom 53 of the header attachment bracket 55, and the feeder house 45 can move forward so the hook 47 is under the pin 49, at which time the feeder house 45 can be raised to engage the hook 47 on the pin 49, and raise the header off the bed assembly 9.

It can be seen comparing the orientations shown in FIGS. 5 and 6 that in addition to the header 3 in FIG. 6 being tilted farther upward, with an increased angle N, the rear end 43 of the header is a reduced height D' above the ground 57 compared to the height D above the ground in FIG. 5. As the bed assembly 9 tilts the portion of the bed assembly 9 on the right side of the bed pivot axis BA moves up, and the portion on the left side of the axis BA moves down. Since the rear end 43 of the header 3 is then closer to the ground, the feeder house can be lower as well, at a reduced or downward angle FN', shown as substantially horizontal in FIG. 6, compared to the upward angle FN in FIG. 5. The front end of the feeder house 45 is thus oriented so the hook 47 at the top end of the header 45 is closer to the header 3, and the bottom edge 51 of the feeder house 45 is farther away from the bottom 53 of the header attachment bracket 55, further facilitating the engagement of the hook 47 and pin 49.

Thus the trailer apparatus 1 of the present invention provides independent adjustment of the width of the bed assembly 9, and the tilt angle N, and allows the bed assembly 9 to pivot to lower one side thereof while the opposite side is raised reduce the distance a header must be raised to be placed on the bed assembly 9.

Figure 7:
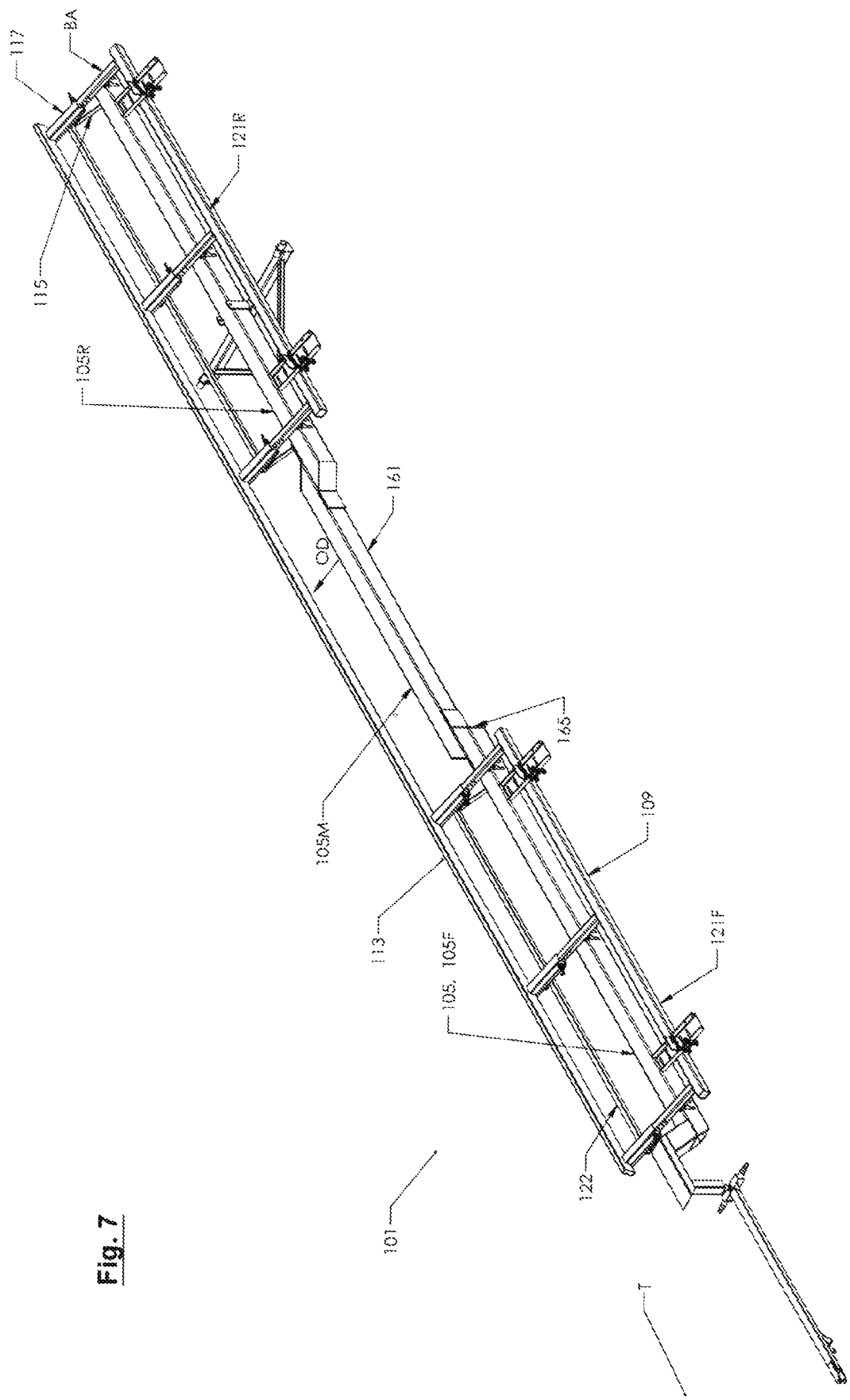
FIG. 7 is a perspective view of an alternate embodiment of a trailer apparatus of the present invention, with a recessed header bed.
Figure 8:
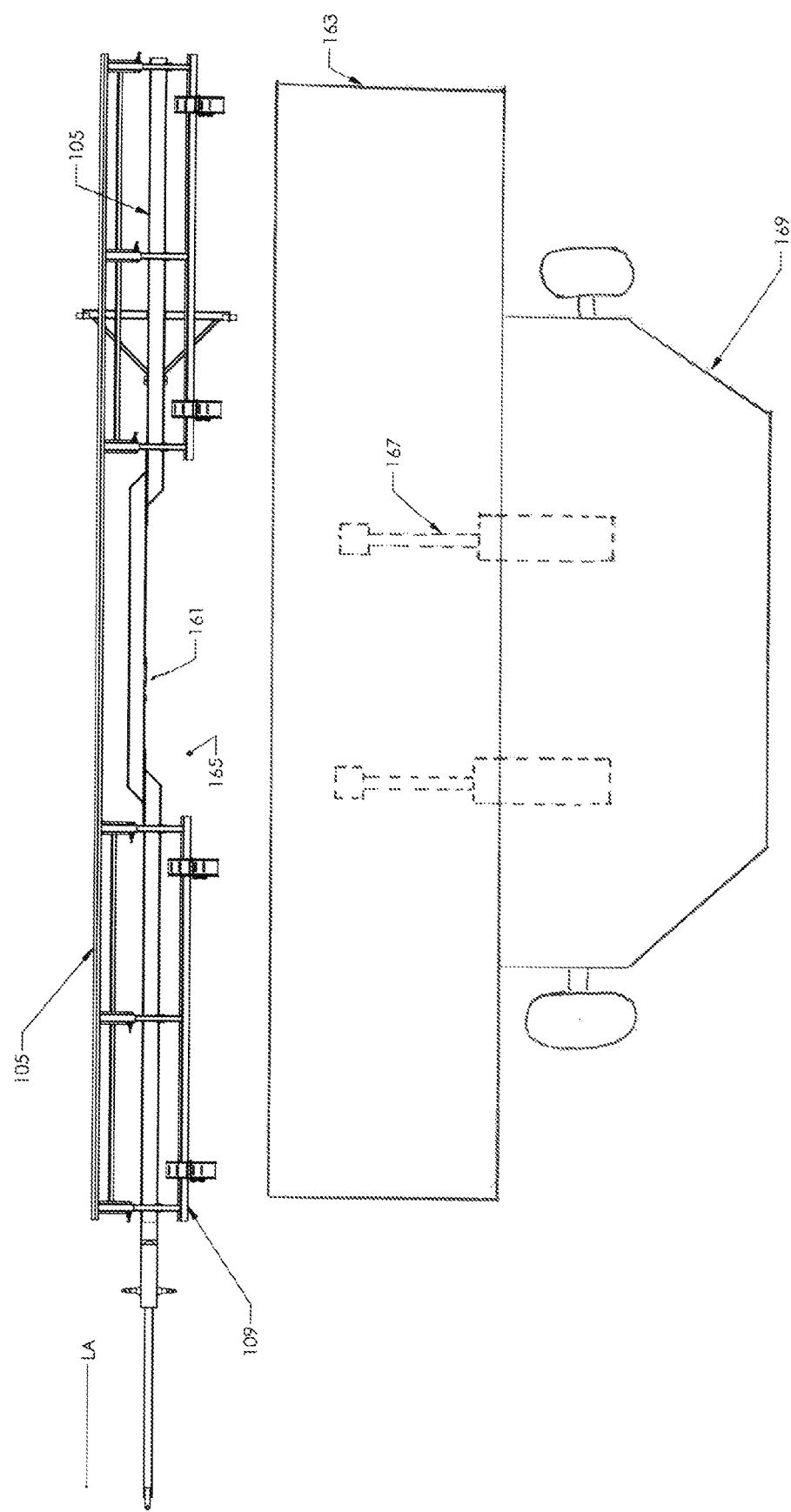
FIG. 8 is a top view of the embodiment of FIG. 7 and shows a self propelled swather header adjacent to the trailer apparatus.

FIGS. 7 and 8 illustrate an alternate trailer apparatus 101 for transporting a harvest header. The trailer apparatus 101 comprises an elongated header bed configured to support a harvest header and supported on wheels for movement in an operating travel direction. The header bed defines a recess on a recessed side thereof configured such that lift arms of a self propelled swather can enter the recess when a header of the swather is being loaded on the header bed.

In the illustrated trailer apparatus 101 the header bed is provided by a main beam 105 and a bed assembly 109. An elongated main beam 105 is supported on wheels (removed for illustration but the same as illustrated in the apparatus 1 above) for movement in an operating travel direction T. As above the wheels are oriented such that a longitudinal axis LA of the main beam 105 is substantially aligned with the operating travel direction T.

A middle portion 105M of the main beam 105 is laterally offset in an offset direction OD from forward and rearward portions 105F, 105R of the main beam 105, such that the main beam 105 defines a lateral main recess 161. In the illustrated apparatus 101, the main beam 105 is made by providing a rear main beam portion 105R and a front main beam portion 105F, and attaching a middle offset beam portion 105M to sides of the front and rear main beam portions 105F, 105R. The main beam portions are conveniently provided by a large rectangular steel tubing, which is cut and welded together to form the off set and thus provide the main recess 161.

A bed assembly 109 is configured to support a harvest header 163, such as is schematically illustrated in FIG. 8. The bed assembly 109 is attached to and extends along a length of the main beam 105. The bed assembly defines a bed recess 165 on a recessed side thereof corresponding to the main recess 161 in the main beam 105.

In the illustrated apparatus 101 the bed assembly 109 comprises a support beam 113 extending substantially from a front end of the bed assembly 109 to the rear end thereof along an un-recessed side of the bed assembly 109 opposite the recessed side of the bed assembly. A front side beam 121F extends from the front end of the bed assembly 109 to a front end of the bed recess 165, and a rear side beam 121R extends from a rear end of the bed recess 165 to the rear end of the bed assembly along the recessed side of the bed assembly 109, opposite the support beam 113. A plurality of cross beams 117 extend from the front and rear side beams 121F, 121R to the support beam 113. The bed recess 165 is thus formed between the front and rear side beams 121F, 121R.

As schematically illustrated in FIG. 8, the main and bed recesses 161, 165 are configured such that lift arms 167 of a self propelled swather 169, under the header 163, can enter the main and bed recesses 161, 165 when the header 163 of the swather 169 is being loaded on the bed assembly 109.

Although it is contemplated that the bed assembly 109 could be fixed to the main beam 105, in the illustrated apparatus 101 each cross beam 117 is pivotally attached at a middle portion thereof to the main beam 105 about a bed pivot axis BA, such that when the recessed side of the bed assembly 109 moves down, the opposite un-recessed side of the bed assembly 109 moves up.

Figure 9:
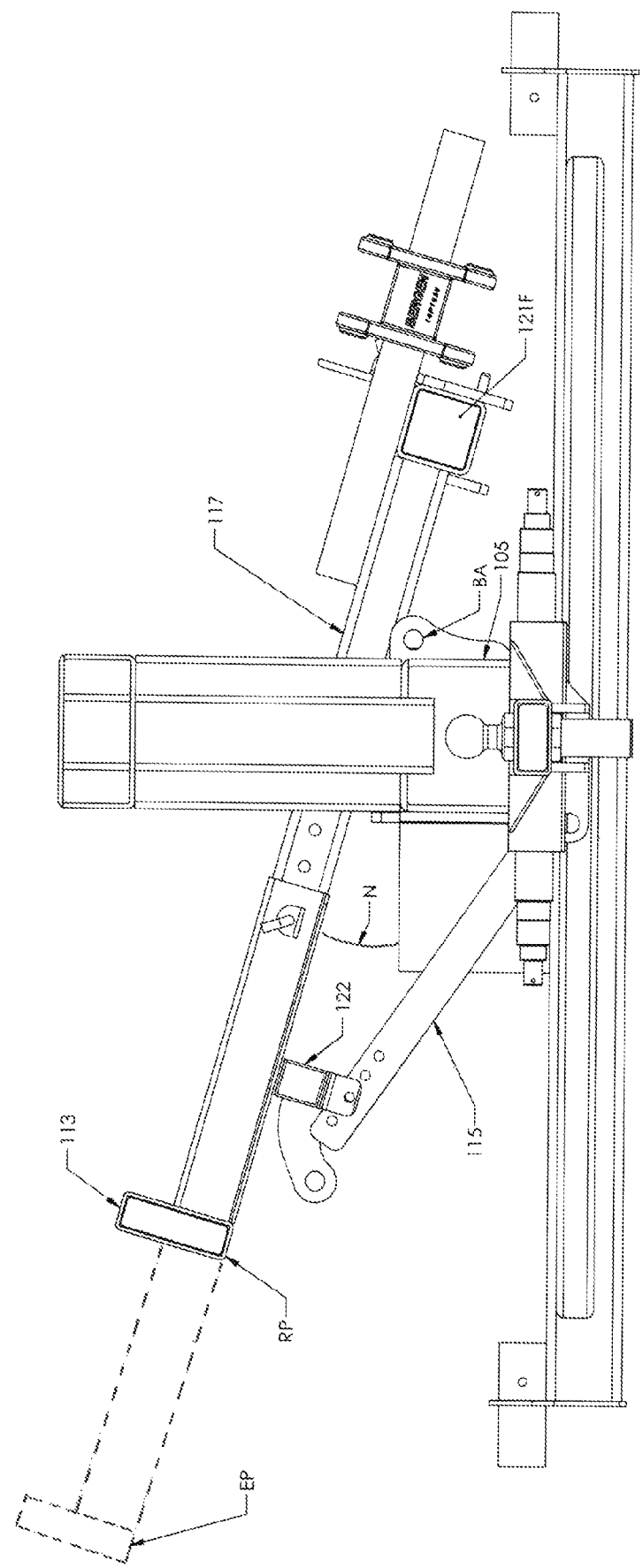
FIG. 9 is a front view of the embodiment of FIG. 7.

FIG. 9 illustrates a somewhat different arrangement of the bed pivot axis BA than that illustrated above for the apparatus 1, but which operates in essentially the same manner. The bed assembly 109 is supported by tilt braces 115 extending from the main beam to the bed assembly 109. The tilt braces 115 are adjustable such that the bed assembly 109 can be oriented at, and releasably locked at, a desired tilt angle N with respect to the main beam 105.

The top surface of the support beam 113 is above a top surface of the cross beams 117 such that the front edge of the header 163 rests on the support beam. Also in the illustrated apparatus 101 the support beam 113 is laterally movable through a range from an extended position EP where the support beam 113 is located a maximum distance from the main beam 105, to a retracted position RP, where the support beam 113 is located a minimum distance from the main beam 105. Each cross beam 117 can be extended and refracted to allow the support beam 113 to move through the range.

A side beam 122 is attached under portions of the cross beams 117 on the un-recessed side of the bed pivot axis BA, and the tilt braces 117 extend from the main beam 105 to the side beam 122.

With the recessed bed of the apparatus 101, comprising main and bed recesses 161, 163, the swather 169 can move the header 163 over the bed assembly 109 to the required position, and then lower same onto the bed assembly 109 without the lift arms 167 and brackets and the like under the header of the swather 169 contacting the bed assembly 109 or main beam 105. The header 163 is well supported at right and left ends thereof, and at the front end thereof, while the middle rear portion extends over the recess.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A trailer apparatus for transporting a harvest header, the apparatus comprising an elongated header bed configured to support a harvest header and supported on wheels for movement in an operating travel direction, the header bed comprising:
   an elongated main beam supported on the wheels, the wheels oriented such that a longitudinal axis of the main beam is substantially aligned with the operating travel direction;
   wherein a middle portion of the main beam is laterally offset in an offset direction from forward and rearward portions of the main beam, such that the main beam defines a lateral main recess;
   a bed assembly configured to support a harvest header, the bed assembly attached to and extending along a length of the main beam, the bed assembly defining a bed recess on a recessed side thereof corresponding to the main recess in the main beam;
   wherein the main recess and bed recess cooperate to form a recess in the header bed configured such that lift arms of a self propelled swather can enter the recess when a header of the swather is being loaded on the header bed.

2. The apparatus of claim 1 wherein the bed assembly comprises:
   a support beam extending substantially from a front end of the bed assembly to a rear end thereof along an un-recessed side of the bed assembly opposite the recessed side of the bed assembly;
   a front side beam extending from the front end of the bed assembly to a front end of the bed recess, and a rear side beam extending from a rear end of the bed recess to the rear end of the bed assembly along the recessed side of the bed assembly;
   a plurality of cross beams extending from the front and rear side beams to the support beam.

3. The apparatus of claim 2 wherein each cross beam is pivotally attached at a middle portion thereof to the main beam about a bed pivot axis, such that when the recessed side of the bed assembly moves down, the opposite un-recessed side of the bed assembly moves up, and wherein the bed assembly is supported by tilt braces extending from the main beam to the bed assembly, and wherein the tilt braces are adjustable such that the bed assembly can be oriented at, and releasably locked at, a desired tilt angle with respect to the main beam.

4. The apparatus of claim 3 wherein a top surface of the support beam is above a top surface of the cross beams, and wherein the support beam is laterally movable through a range from an extended position, where the support beam is located a maximum distance from the main beam, to a retracted position, where the support beam is located a minimum distance from the main beam.

5. The apparatus of claim 4 wherein each cross beam can be extended and retracted to allow the support beam to move through the range.

6. The apparatus of claim 5 wherein a side beam is attached under portions of the cross beams on the un-recessed side of the bed assembly, and wherein the tilt braces extend from the main beam to the side beam.

7. The apparatus of claim 1 wherein the middle portion of the main beam is attached to corresponding sides of the forward and rearward portions of the main beam.

* * * * *